Jan. 3, 1939.  F. L. HAUSHALTER  2,142,872
CUSHIONED CONNECTION
Filed Nov. 17, 1936  2 Sheets-Sheet 1
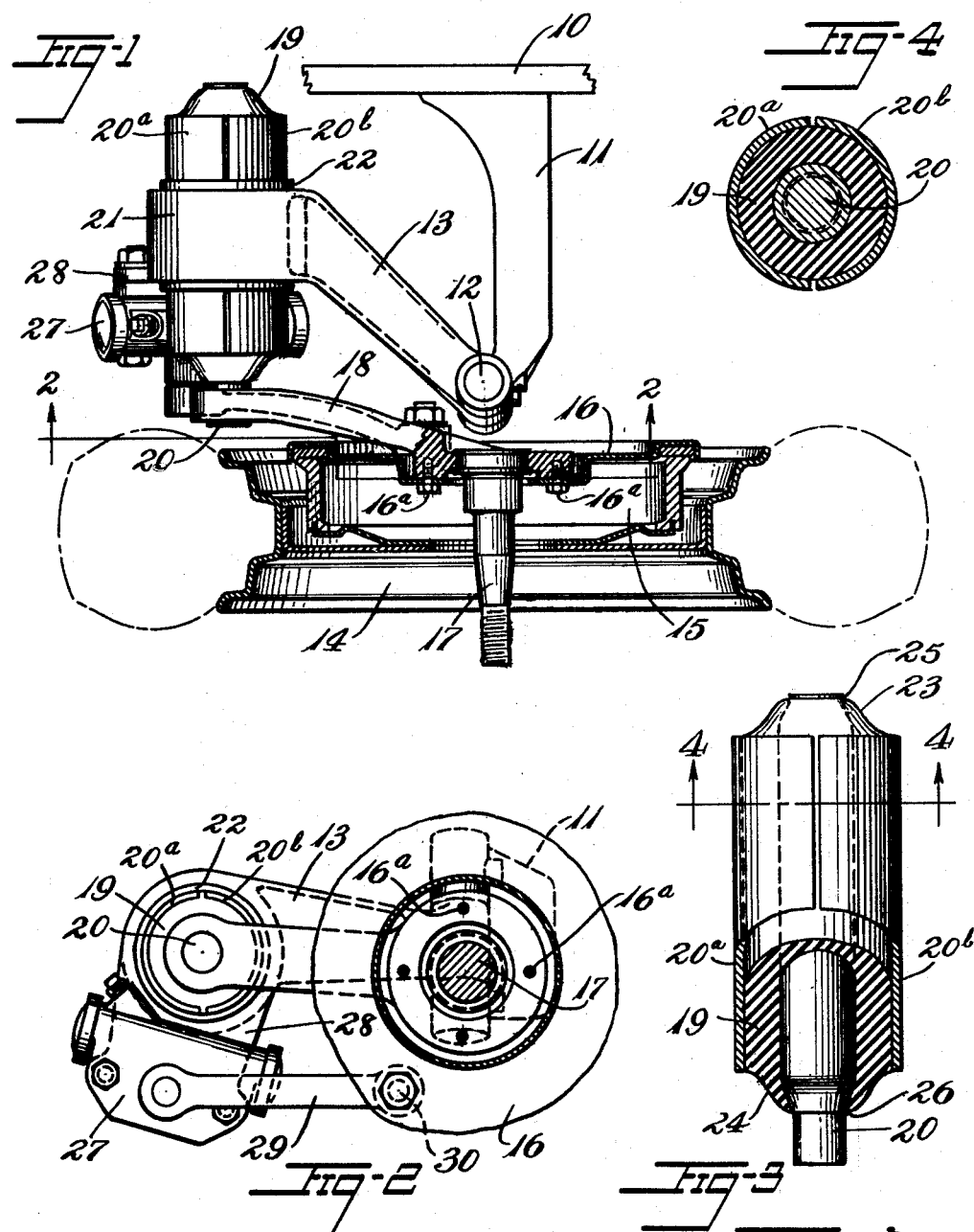
Inventor
Fred L. Haushalter
By Willis F. Avery
Atty.

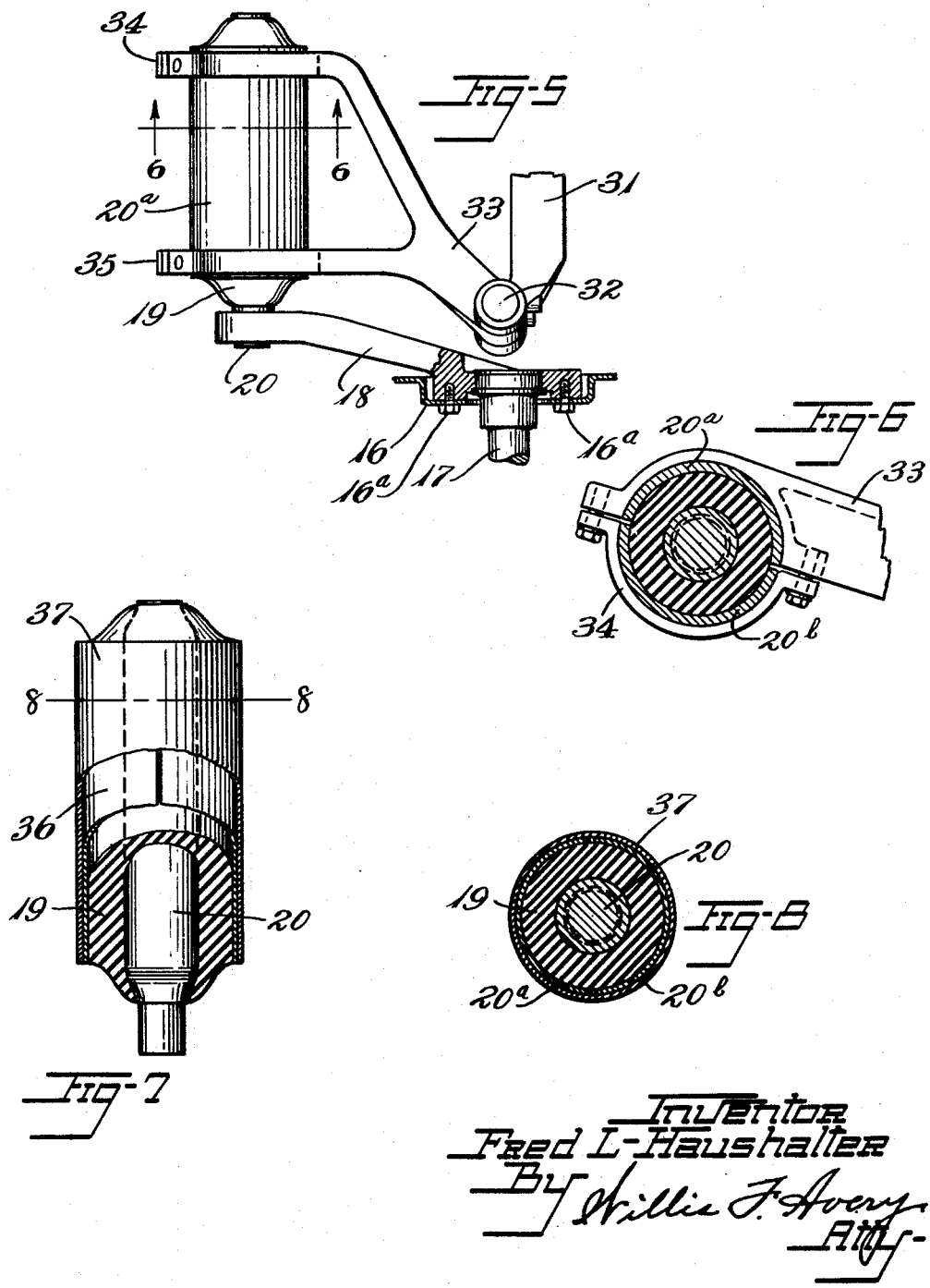

Patented Jan. 3, 1939

2,142,872

UNITED STATES PATENT OFFICE 2,142,872

CUSHIONED CONNECTION

Fred L. Haushalter, Akron, Ohio, assignor to The
B. F. Goodrich Company, New York, N. Y., a
corporation of New York Application November 17, 1936, Serial No. 111,247

15 Claims. (Cl. 267—21)

This invention relates to cushioned connections, and especially to mountings for resiliently supporting wheels of vehicles.

The chief objects of the invention are to provide an improved cushioned connection, and to provide an improved independent suspension type mounting for a wheel assembly. More specific objects are to provide for supporting the wheel by torsional stress of a rubber bushing that is rugged, compact, and conveniently inserted and replaced in its mounting.

These and further objects will be apparent from the following description reference being had to the accompanying drawings in which:

Fig. 1 is a plan view, with parts sectioned and broken away, of a wheel assembly mounted upon the vehicle for steering, and constructed according to and embodying the invention.

Fig. 2 is a section taken along the line 2—2 of Fig. 1.

Fig. 3 is a plan view with parts sectioned and broken away of the bushing unit of the cushioning structure of Fig. 1.

Fig. 4 is a section taken along the line 4—4 of Fig. 3.

Fig. 5 is a view like Fig. 1 but showing a modification.

Fig. 6 is a section taken along the line 6—6 of Fig. 5.

Fig. 7 is a view like Fig. 3 but showing a modified form of cushioning element.

Fig. 8 is a section taken along the line 8—8 of Fig. 7.

While features of the invention are useful in cushioned connections generally, the invention is especially well suited to the mounting of wheel assemblies on vehicles, and especially to independent wheel suspension mountings. In Fig. 1 is illustrated an application of the invention to the independent mounting of one of the steering wheels of an automobile, although features of the invention are applicable as well to other wheels of a vehicle.

Upon a frame or body element 10 of the vehicle is mounted a projecting bracket 11 which is provided at its outer end with a steering pivot 12. An arm 13, turning about the pivot 12 carries a cushioned mounting for a wheel structure 14 which may comprise a brake drum 15 rotatable with relation to a non-rotating brake spider 16. The web 14 is mounted upon a suitable hub and bearing assembly, not shown, rotating upon a spindle 17. The spindle 17 is rigidly mounted at one end of an arm 18, the other end of which is secured at one end of the shaft element of the cushioned mounting. The brake spider 16 is secured, as by bolts 16a, to the arm 18.

The cushioned mounting comprises a rubber body 19, preferably annular, having an inner shaft element 20 and an outer circumferentially discontinuous sleeve structure, preferably in the form of a plurality of separate metal sleeve sections 20a and 20b. The rubber body 19 preferably is molded within the sleeve sections and upon the shaft element and preferably is adhered to the shaft element and the sleeve sections by vulcanization. The circumferentially discontinuous construction of the sleeve structure permits the bushing to be inserted as a unit in an enclosing eye 21 at the end of the arm 13 under a considerable radial compression of the rubber, the sleeve sections and the rubber being held in the eye pressed toward the shaft element 20. If desired, an auxiliary sleeve 22 acting as a shim may be inserted between the sleeve structure 20a, 20b and the supporting eye 21 for convenience of assembly and for the purpose of providing the desired degree of radial compression of the rubber. Inasmuch as the radial compression of the rubber makes possible a very high binding force of the bushing within the eye 21 or sleeve 22 no retaining means other than the tight fit need be provided, but, if desired, suitable additional retaining means such as set screws or keys, not shown, may be added.

By providing the discontinuous sleeve structure of the bushing of a suitably heavy gauge metal or other strong material it is unnecessary to support the sleeve structure by the enclosing eye entirely along the length of the sleeve structure, and this has the advantage, in addition to providing compactness of structure, of facilitating assembly and disassembly of the mounting, the bushing, including its shaft element, rubber and sleeve sections being manufactured and handled as a unit. The exposed surface of the sleeve structure facilitates the application of suitable squeezing devices to lessen the pressure of the bushing in the eye 21 to permit the easy insertion of the bushing into the eye, and, in like manner, removal of the bushing from the eye is facilitated.

For the purpose of reducing the stress at the end surfaces of the rubber resulting from the torsional movement of the rubber under wheel deflection, it is preferred to make the bushing of the construction shown in Figs. 1 and 3. The diameter of the rubber is reduced gradually toward its ends, as at 23 and 24, so that a greater length of rubber end surfaces is provided between the shaft and the sleeve structure, which has the effect of reducing the unit stress at the end surfaces of the rubber. For further reducing the unit stress on the end surfaces of the rubber the shaft 19 may be of reduced diameter at the positions where the ends of the rubber contact it as at 25 and 26. This increases the extent of the end surface of the rubber from shaft to sleeve, and at the same time makes possible a desirably large diameter of the shaft in its central region where a large surface area, to provide a strong union with the rubber, is desired.

While the rubber itself possesses a degree of shock-absorbing ability, an auxiliary shock absorber 27 may be provided, if desired. This is rigidly secured as by means of a depending bracket 28 to the eye structure 21 of the arm 13, and is operated as by a lever 29 pivoted at 30 to the non-rotating brake spider 16.

In the modifications of Figs. 5 and 6 the bushing is supported by axially spaced clamping elements rather than the single, centrally located eye of Fig. 1. In Fig. 5 a bracket 31, corresponding to bracket 11 of Fig. 1, has a steering pivot 32 at its outer end for supporting a Y-shaped arm structure 33, at the outer ends of which are provided arcuate clamps 34 and 35. These clamps and the sleeve-engaging elements of the arm 33 may be relatively narrow, leaving a considerable extent of the sleeve structure of the bushing exposed, the sleeve material being provided of sufficient strength to be self-sustaining against the forces to which it is subjected. As in the embodiment of Fig. 1, an arm 18 secured to the shaft 20 of the bushing carries a wheel spindle 17 and a brake spider 16 at its outer end for supporting the wheel assembly.

In the embodiment of Figs. 7 and 8, a circumferentially discontinuous sleeve structure 36 of the bushing may be of light gauge metal, and for providing the desired rigidity of the sleeve structure so that it may be mounted by locally applied support, the bushing is compressed within an auxiliary sleeve 37 of the required stiffness to provide a bushing unit that is self-sustaining, and it may be inserted in its mounting and held therein by a force fit or by suitable keys or set screws. In the embodiment of Fig. 7, as well as in the embodiment of Fig. 3, the bushing constitutes a unit that may be inserted and replaced conveniently in its mounting. While this unitary construction of the bushing is preferred, the inner and outer metal elements and the rubber may be provided in the form of two or more sectional units, if desired, each unit consisting of a half or sector of the shaft element, rubber and sleeve.

Owing to the compactness and ruggedness of the bushing unit and mounting structure the invention is well suited to the wheel suspension illustrated, wherein the wheel assembly has its cushioned mounting between the steering pivot and the wheel. Owing largely to the fact that the rubber is under radial compression it is adequately stiff in the direction to resist excessive tilting of the inner shaft element with respect to the sleeve structure under load forces, even though the wheel assembly is mounted at one end only of the shaft element. Cushioning by the rubber bushing is effective in all directions of the forces on the wheel assembly, and the arrangement provides complete insulation, by the rubber, of the body structure from the wheel assembly.

Variations may be made without departing from the scope of the invention as it is defined in the following claims.

I claim:

1. A cushioned connection comprising supporting and supported members, a cushioning structure connecting the said members, said cushioning structure comprising an inner element, a body of rubber upon said element, a circumferentially discontinuous sleeve structure enclosing the rubber, but leaving the rubber with free end faces, and an enclosing structure holding the sleeve and rubber pressed toward the inner element, the enclosing structure extending over only a portion of the length of the sleeve structure leaving extensive surface area of the latter exposed and the parts being held in non-slipping relation to one another so that relative movement of the members is cushioned by torsional stress on the rubber.

2. A vehicle having a wheel assembly, said vehicle comprising a cushioned supporting connection for the wheel assembly, the connection comprising an inner element, a body of rubber upon said element, a discontinuous sleeve structure about the rubber body and an enclosing structure holding the said sleeve structure and rubber pressed toward the inner element with the end face of the rubber body free and in such arrangement that the supported structure is supported by the wheel assembly by torsional stress on the rubber body.

3. A vehicle having a wheel assembly, said vehicle comprising a cushioned supporting connection for the wheel assembly, the connection comprising an inner shaft element disposed transversely of the vehicle, a body of rubber upon the shaft element, a discontinuous sleeve structure about the rubber body and an enclosing structure holding the said sleeve structure and rubber body held pressed toward the inner shaft element with the end face of the rubber body free and in such arrangement that the supported structure is supported by the wheel assembly by torsional stress of the rubber body.

4. A vehicle as defined in claim 2 in which the enclosing structure holds the sleeve structure pressed radially inward by contact therewith only over a portion of the axial length of the sleeve structure.

5. A torsional cushioned connection comprising an inner shaft element, an annular body of rubber about the shaft element and an enclosing sleeve structure, the shaft element having a substantially uniform radial thickness throughout the major portion of its rubber-contacting length and reduced portions at the ends of the first said portion, and the rubber body having end surfaces terminating upon the reduced portions of the shaft element and being correspondingly reduced in inside diameter at such portions thereby providing increased end surfaces of the rubber body.

6. A torsional cushioned connection comprising an inner shaft element, an annular body of rubber about the shaft element and an enclosing, circumferentially discontinuous sleeve structure, the shaft element having a substantially uniform radial thickness throughout the major portion of its rubber-contacting length and reduced portions at the ends of the first said portion, and the rubber body having end surfaces terminating upon the reduced portions of the shaft element and being correspondingly reduced in inside diameter at such portions thereby providing increased end surfaces of the rubber body.

7. A cushioned connection comprising supporting and supported members, a cushioning structure connecting the said members, said cushioning structure comprising an inner element, a body of rubber upon said element, a circumferentially discontinuous sleeve structure enclosing the rubber, and an enclosing structure holding the sleeve structure and rubber pressed toward the inner element, the enclosing structure extending over only a portion of the length of the sleeve structure centrally of the latter leaving extensive surface area of the end portions of the sleeve structure exposed.

8. A cushioned connection comprising supporting and supported members, a cushioning structure connecting the said members, said cushioning structure comprising an inner element, a body of rubber upon said element, a circumferentially discontinuous sleeve structure enclosing the rubber, and an enclosing structure holding the sleeve structure and rubber pressed toward the inner element, the enclosing structure extending over only a portion of the length of the sleeve structure at a plurality of positions spaced apart axially thereof leaving extensive surface area of the sleeve structure exposed.

9. A cushioned connection comprising supporting and supported members, a cushioning structure connecting the said members, said cushioning structure comprising an inner element, a body of rubber upon said element, a circumferentially discontinuous sleeve structure enclosing the rubber, an enclosing structure holding the sleeve structure and rubber pressed toward the inner element, the enclosing structure extending over only a portion of the length of the sleeve structure leaving extensive surface area of the latter exposed, and a circumferentially continuous sleeve held within the enclosing structure and holding the circumferentially discontinuous sleeve structure and rubber pressed toward the inner element.

10. A cushioned connection comprising supporting and supported members, a cushioning structure, said cushioning structure comprising an inner element, a body of rubber upon said element, a circumferentially discontinuous sleeve structure enclosing the rubber and having means for holding the sleeve and rubber pressed toward the inner element, and means for connecting the cushioning structure with said members, the connecting means comprising elements upon said discontinuous sleeve structure at a plurality of positions spaced apart axially thereof and extending over only a portion of the length of the sleeve structure leaving extensive surface area of the latter exposed.

11. A cushioned connection comprising supporting and supported members, a cushioning structure, said cushioning structure comprising an inner element, a body of rubber upon said element, a circumferentially discontinuous sleeve structure enclosing the rubber and having means for holding the sleeve structure and rubber pressed toward the inner element and means for connecting the cushioning structure with said members, the connecting means comprising an element upon said discontinuous sleeve structure centrally of the latter and extending over only a portion of the length of the sleeve structure leaving extensive surface area of the latter exposed.

12. A vehicle having a wheel assembly mounted for steering about a pivotal axis, the mounting comprising a cushioned connection including a body of rubber interposed between the pivotal axis and the wheel assembly for transmitting substantially the entire load on said wheel assembly by torsional stress on the rubber body, said connection comprising an inner element for the rubber body, a circumferentially discontinuous sleeve structure enclosing the rubber body and means holding said sleeve and rubber body pressed toward said inner element.

13. A vehicle having a wheel assembly, said vehicle comprising a cushioned supporting connection for the wheel assembly, the connection comprising an inner element, a body of rubber upon said element, a circumferentially discontinuous sleeve element upon the rubber body, and means holding the said sleeve element and rubber pressed toward the inner element, the arrangement being such that substantially the entire load on the wheel assembly is transmitted by torsional stress on the rubber body, said rubber body being bonded to at least the said inner element.

14. A vehicle having a wheel assembly, said vehicle comprising a cushioned supporting connection for the wheel assembly, the connection comprising an inner element, a body of rubber upon said element, a circumferentially discontinuous sleeve element upon the rubber body, and means holding the said sleeve element and rubber pressed toward the inner element in such arrangement that substantially the entire load on the wheel assembly is transmitted by torsional stress on the rubber body, said rubber body being bonded to the said inner element and the said discontinuous sleeve element and the body having free end faces.

15. A vehicle having a wheel assembly, said vehicle comprising a cushioned supporting connection for the wheel assembly, the connection comprising an inner element, a body of rubber upon said element, a discontinuous sleeve structure about the rubber body and means for holding the said sleeve structure and rubber pressed radially inward toward the inner element with the end face of the rubber body free and with the parts held in such arrangement that the supported structure is supported by the wheel assembly by torsional stress on the rubber.

FRED L. HAUSHALTER.